United States Patent Office 3,418,320
Patented Dec. 24, 1968

3,418,320
1-(5-NITRO-2-FURFURYL)HYDROURACIL
Leonard Doub, Bloomfield Hills, Mich., assignor to Parke, Davis & Company, Detroit, Mich., a corporation of Michigan
No Drawing. Filed Oct. 3, 1966, Ser. No. 583,974
1 Claim. (Cl. 260—260)

ABSTRACT OF THE DISCLOSURE 1-(5-nitro-2-furfuryl)hydrouracil. The compound has antibacterial activity and can be produced by reacting 1-furfurylhydrouracil with a lower alkanoyl nitrate followed by reacting the resulting product with a base.

---

This invention relates to a new organic nitro compound. More particularly, the invention relates to the new compound, 1-(5-nitro-2-furfuryl)hydrouracil of the formula

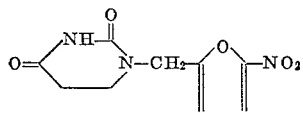

and to a process for its production.

In accordance with the invention, the foregoing compound is produced by reacting 1-furfurylhydrouracil of the formula

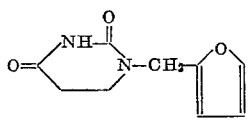

with a lower alkanoyl nitrate followed by reacting the resulting product with a base. The preferred lower alkanoyl nitrate is acetyl nitrate. The first step of the process is carried out by reacting the 1-furfurylhydrouracil with at least 1 equivalent and preferably a considerable excess (2 equivalents or more) of the lower alkanoyl nitrate. The preferred method of carrying out this reaction is by quickly adding the 1-furfurylhydrouracil to a vigorously stirred solution of the lower alkanoyl nitrate at a temperature between about —25° and 0° C. The reaction that occurs is rapid and essentially complete in about 5 minutes. Longer reaction periods and temperatures up to about 25° C. can be used, but to avoid decomposition prolonged reaction times at higher temperatures are avoided. A suitable solvent for the reaction is a lower alkanoic acid anhydride, and the lower alkanoyl nitrate used as nitrating agent is most commonly prepared in situ by the reaction of nitric acid and the lower alkanoic acid anhydride also used as solvent. For example, acetyl nitrate for use in the reaction can be prepared by adding 70% nitric acid to an excess of acetic anhydride at a temperature between 10° and 25° C. Temperatures outside this range are avoided because of difficulties in controlling the rate of reaction. The second step of the process is carried out by reacting the intermediate product, formed as described above, with a base. For this purpose the reaction mixture can first be poured into ice water and allowed to stand until hydrolysis of unreacted lower alkanoic acid anhydride is complete. A base such as an alkali metal hydroxide, carbonate, or bicarbonate, or an organic amine, is added, preferably to a pH of about 4.8 to 6.0, and the mixture is stirred or allowed to stand for a few hours or until separation of the 1-(5-nitro-2-furfuryl)hydrouracil is complete. Knowledge of the exact nature of the intermediate product formed by reaction of the starting material with a lower alkanoyl nitrate is not essential in carrying out the process. The intermediate product may, in fact, consist of a mixture containing a component in which the furan ring has been opened.

The 1-furfurylhydrouracil required as a starting material in the foregoing process can be prepared by any of a variety of methods. For example, furfurylamine is reacted with acrylonitrile and the resulting β-furfurylaminopropionitrile is reacted with potassium cyanate and dilute hydrochloric acid to produce 1-(2-cyanoethyl)-1-furfurylurea. The latter compound is reacted with sodium methoxide to cause ring closure with the production of 1-furfuryl-5,6-dihydrocytosine, which is heated with dilute hydrochloric acid to produce 1-furfurylhydrouracil.

The compound of the invention is a new chemical compound useful as an antibacterial agent having a wide range of antibacterial activity, and relatively high water solubility. For example, it shows especially good antibacterial activity against *E. coli* and *K. pneumoniae* as well as against streptococci and salmonellae. The compound can be administered orally or parenterally and oral administration is preferred. Its relatively high water solubility increases its value in a special field of application as a urinary tract antibacterial agent.

The invention is illustrated by the following example. With external cooling to maintain the temperature at about 15–20° C., 14.7 ml. of 70% nitric acid is added in portions of 0.8 ml. to 75 ml. of acetic anhydride. The resulting clear solution containing acetyl nitrate is chilled and held at a temperature between —10° and 0° C. while 15.07 g. of 1-furfurylhydrouracil is added. After the addition is complete, the mixture is stirred for 15 minutes at —2° to —5° C. and then poured into 300 ml. of ice water and allowed to stand for 30 minutes, or until hydrolysis of unreacted acetic anhydride is complete. The aqueous solution is adjusted to pH 4.9 with potassium bicarbonate and stirred for 3 hours. The insoluble product which separates is collected on a filter. It is 1-(5-nitro-2-furfuryl)hydrouracil. For purification, it is crystallized from water and the crystalline product collected, washed with ice water and with ether, and dried at 60° C. in a vacuum oven; M.P. 127–173.5° C.

By the foregoing procedure, with the substitution of an equivalent amount of propionic anhydride for the acetic anhydride, the same product, 1-(5-nitro-2-furfuryl)hydrouracil, is obtained.

The starting material can be prepared as follows. Over a period of 3½ hours, 200 ml. of acrylonitrile is slowly added to 291.3 g. of furfurylamine at 90–100° C. The resulting solution is allowed to cool and stand overnight and is then distilled under reduced pressure. A fraction of β-furfurylaminopropionitrile is collected; B.P. 141–145° C. at 9 mm. An approximately neutral solution is prepared by adding 955 ml. of 2 N aqueous hydrochloric acid to 287.3 g. of β-furfurylaminopropionitrile, with external cooling to maintain the temperature at about 25° C. The resulting solution, pH about 6.7, is treated with 158.4 g. of 97.8% pure potassium cyanate. The solution becomes turbid but is clarified by heating to about 79° C. A small portion of this solution is removed and concentrated to an oil. Crystallization of the oil is induced by trituration with ether. The main body of the reaction mixture is slowly cooled and when it becomes turbid the crystals obtained by trituration are added. The mixture is finally chilled to 40° C. and the insoluble product is collected on a filter and washed with ice water and with ether. It is 1-(2-cyanoethyl)-1-furfurylurea; M.P. 73–75° C. following crystallization from isopropyl alcohol. Freshly cut metallic sodium, 3.45 g., is dissolved in 200 ml. of absolute methanol and the resulting solution treated with 96.6 g. of 1-(2-cyanoethyl)-1-furfurylurea. The resulting mixture is heated under reflux for about a minute, or until a thick, white precipitate forms. The mixture is cooled and the insoluble product is collected on a filter, washed with chilled methanol and with ether, and dried in a vacuum oven for 16 hours at 60° C. This product is 1-furfuryl-5,6-dihydrocytosine. For purification, it is crystallized from absolute ethanol; M.P. 204–208° C. A solution of 77.6 g. of 1-furfuryl-5,6-dihydrocystosine in 300 ml. of 2 N aqueous hydrochloric acid is heated at 80° C. until the clear, colorless solution becomes orange. The solution is cooled slowly and finally chilled to 0° C. until crystallization of the product is complete. The insoluble product is collected on a filter, washed with ice water, with cold ethanol, and with ether, and dried at 60° C. in a vacuum oven. This product is 1-furfurylhydrouracil; M.P. 110–111.5° C. following crystallization from absolute ethanol.

I claim:
1. 1-(5-nitro-2-furfuryl)hydrouracil.

References Cited

UNITED STATES PATENTS 2,898,335  8/1959  Michels.

OTHER REFERENCES

Weygand, C.: Organic Preparations. Interscience Publishers, Inc., New York, 1945, pp. 282–283, relied on.

NICHOLAS S. RIZZO, *Primary Examiner.*

A. M. TIGHE, *Assistant Examiner.*

U.S. Cl. X.R.

167—65, 33